US012609540B2

(12) United States Patent
Munnangi et al.

(10) Patent No.: US 12,609,540 B2
(45) Date of Patent: Apr. 21, 2026

(54) SYSTEM AND METHOD FACILITATING TRANSLATION OF POWER DELIVERY AND QUICK CHARGE MESSAGE COMMUNICATION

(71) Applicant: SILICONCH SYSTEMS PVT LTD, Karnataka (IN)

(72) Inventors: Sirisha Munnangi, Andhra Pradesh (IN); Kaustubh Kumar, Uttar Pradesh (IN); Rakesh Kumar Polasa, Karnataka (IN); Nischal Ramesh, Karnataka (IN); Sandesh Ts, Karnataka (IN)

(73) Assignee: SILICONCH SYSTEMS PRIVATE LIMITED, Karanataka (IN)

( * ) Notice: Subject to any disclaimer, the term of this patent is extended or adjusted under 35 U.S.C. 154(b) by 978 days.

(21) Appl. No.: 17/838,108

(22) Filed: Jun. 10, 2022

(65) Prior Publication Data
US 2023/0187947 A1 Jun. 15, 2023

(30) Foreign Application Priority Data
Dec. 11, 2021 (IN) ............................ 202141057724

(51) Int. Cl.
*H02J 7/47* (2026.01)
*G06F 1/26* (2006.01)
(Continued)

(52) U.S. Cl.
CPC ................ *H02J 7/47* (2026.01); *G06F 1/266* (2013.01); *G06F 13/387* (2013.01);
(Continued)

(58) Field of Classification Search
CPC ...... G06F 1/266; G06F 13/385; G06F 13/387; G06F 13/4027; G06F 13/4077;
(Continued)

(56) References Cited

U.S. PATENT DOCUMENTS

2017/0222459 A1*  8/2017  Kang ..................... H02J 7/0042
2018/0032044 A1*  2/2018  Shpiro ................... G05B 15/02
2024/0088711 A1*  3/2024  Karuppusamy ...... H02J 7/00711

FOREIGN PATENT DOCUMENTS

CN       222191879 U  * 12/2024  ................ H02J 7/00
WO    WO-2019010822 A1 *  1/2019  ............... H04L 9/40

OTHER PUBLICATIONS

"ChargerLAB Power-Z USB PD Tester Charging Voltage Ammeter Power Bank Detector FL001C (Color: Blue)". Amazon. Online 28 2020. Retrieved from Internet Jul. 10, 2025. <https://www.amazon. co.jp/-/en/ChargerLAB-POWER-Z-Charging-Voltage-Detector/dp/ B0B68VGJJ3>. (Year: 2020).*

(Continued)

*Primary Examiner* — Thomas J. Cleary
(74) *Attorney, Agent, or Firm* — Procopio, Cory, Hargreaves & Savitch LLP

(57) ABSTRACT

The present disclosure relates to a system and method to enable power negotiations between a Quick Charge (QC) power source with no USB power delivery (USBPD) support and a USBPD device. The proposed method identifies the support of USBPD and QC in the devices; determines the possibility of direct communication between the devices over either the D+/D– lines or the CC lines, initiates the power negotiations between USBPD device and QC power source either by translating the USBPD messages on CC line to QC signalling on the D+/D– lines and vice versa, or by handling the USBPD messages independently or combination of both; enable the fast charging of USBPD device till the maximum capacity of QC power source complying with USBPD and QC specifications.

17 Claims, 6 Drawing Sheets

(51) Int. Cl.

| | |
|---|---|
| *G06F 13/38* | (2006.01) |
| *G06F 13/42* | (2006.01) |
| *H02J 7/42* | (2026.01) |
| *H02J 7/90* | (2026.01) |

(52) U.S. Cl.
CPC ............ *G06F 13/4282* (2013.01); *H02J 7/42* (2026.01); *H02J 7/933* (2026.01); *G06F 2213/0042* (2013.01); *H02J 2207/30* (2020.01)

(58) Field of Classification Search
CPC .......... G06F 2213/0042; G06F 13/4282; H02J 7/00034; H02J 7/00045; H02J 7/00712; H02J 2207/30; H02J 7/42; H02J 7/47; H02J 7/485; H02J 7/933
See application file for complete search history.

(56) References Cited

OTHER PUBLICATIONS

"Power-Z FL001 Super Manual". Power-Z. Created Jan. 16, 2020. (Year: 2020).*

"FNIRSI FNB38 USB Meter Tester UPM Review". USB Charging Blog. Online Jul. 26, 2020. Retrieved from Internet Jul. 14, 2025. <https://usbchargingblog.wordpress.com/2020/07/26/fnirsi-fnb38-usb-meter-tester-upm-review/>. (Year: 2020).*

"FNB38 manual". Version 1.2. FNIRSI. Created Jul. 29, 2020. (Year: 2020).*

Universal Serial Bus Type-C Cable and Connector Specification Release 2.0, USB 3.0 Promoter Group, Aug. 2019 (373 pages).

Universal Serial Bus Power Delivery Specification, Revision 3.0, Version 2.0, Aug. 29, 2019 (657 pages).

\* cited by examiner

200

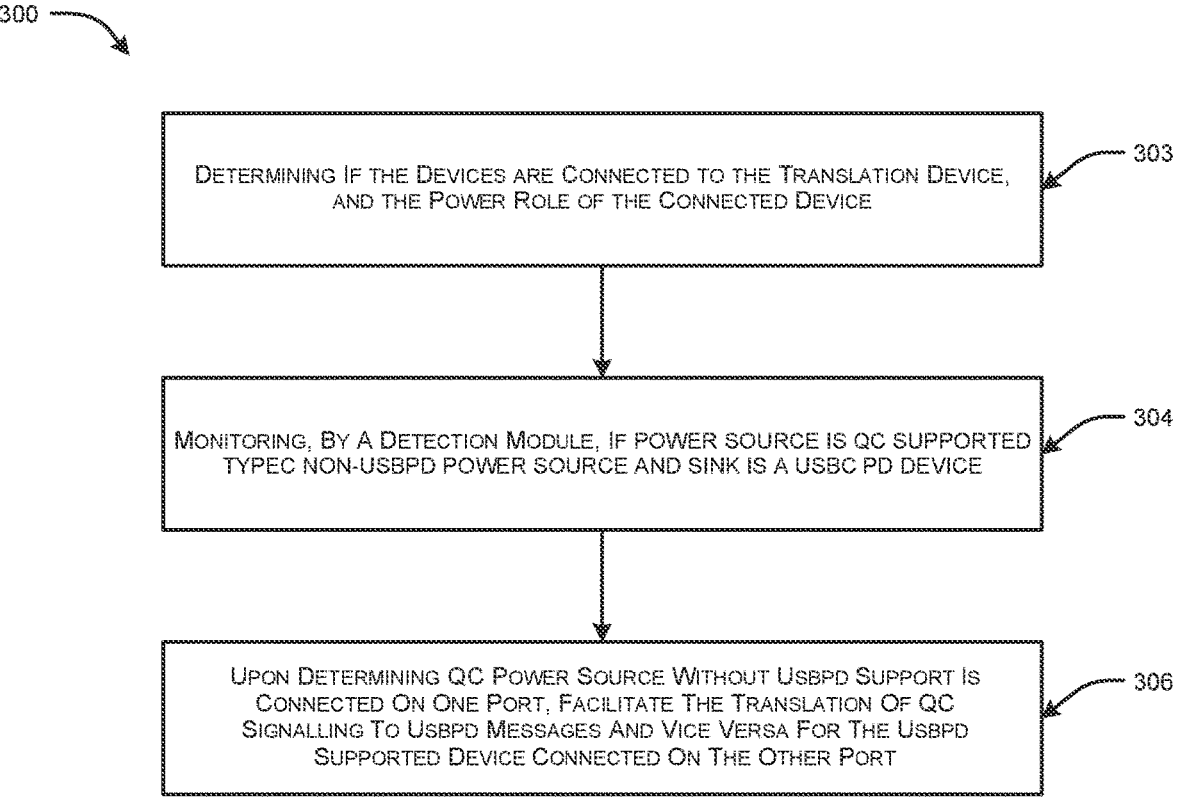

300

DETERMINING IF THE DEVICES ARE CONNECTED TO THE TRANSLATION DEVICE, AND THE POWER ROLE OF THE CONNECTED DEVICE — 303

MONITORING, BY A DETECTION MODULE, IF POWER SOURCE IS QC SUPPORTED TYPEC NON-USBPD POWER SOURCE AND SINK IS A USBC PD DEVICE — 304

UPON DETERMINING QC POWER SOURCE WITHOUT USBPD SUPPORT IS CONNECTED ON ONE PORT, FACILITATE THE TRANSLATION OF QC SIGNALLING TO USBPD MESSAGES AND VICE VERSA FOR THE USBPD SUPPORTED DEVICE CONNECTED ON THE OTHER PORT — 306

FIG. 3

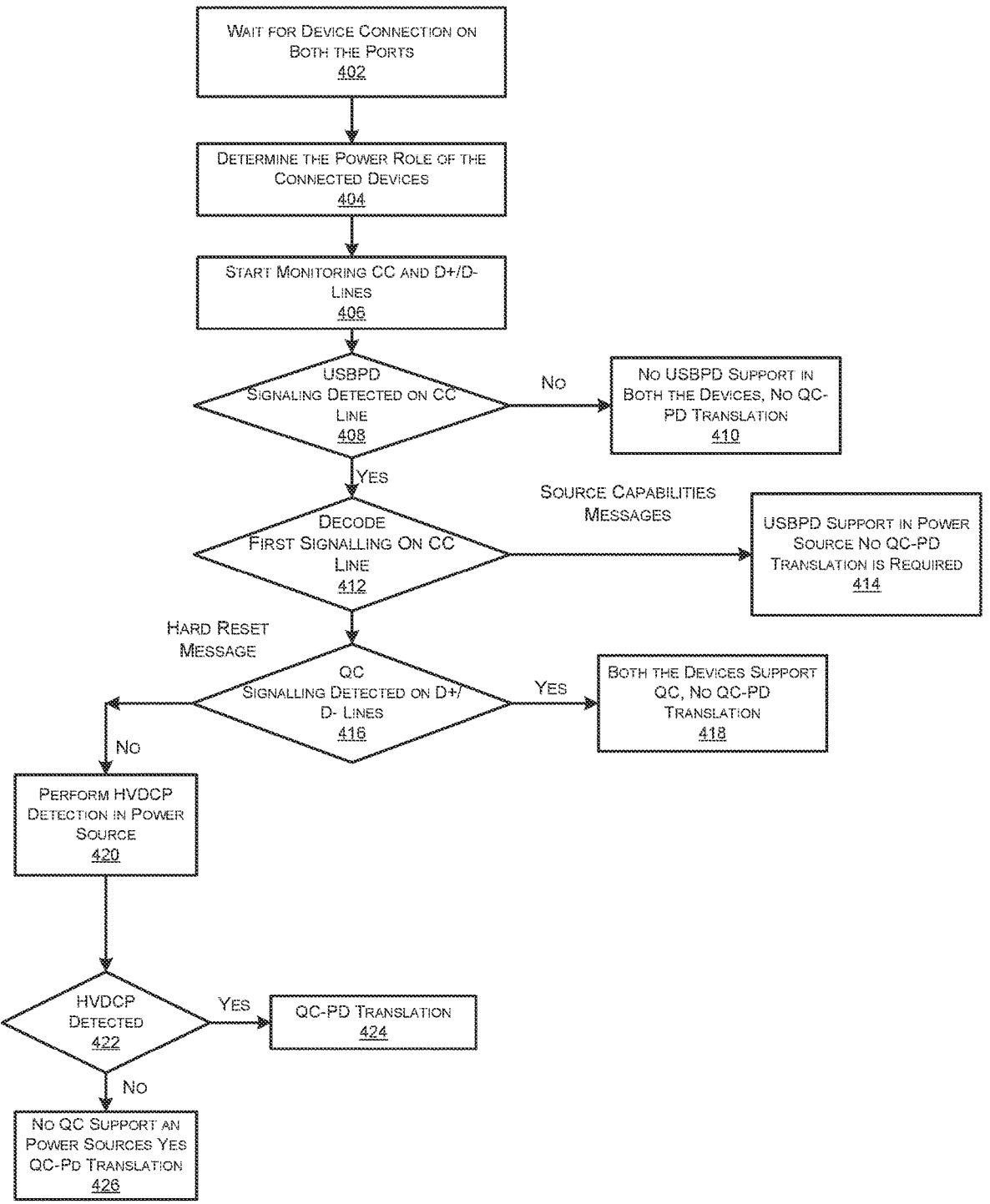

WAIT FOR DEVICE CONNECTION ON
BOTH THE PORTS
402

DETERMINE THE POWER ROLE OF THE
CONNECTED DEVICES
404

START MONITORING CC AND D+/D-
LINES
406

USBPD
SIGNALING DETECTED ON CC
LINE
408

No → NO USBPD SUPPORT IN
BOTH THE DEVICES, NO QC-
PD TRANSLATION
410

YES

SOURCE CAPABILITIES
MESSAGES

DECODE
FIRST SIGNALLING ON CC
LINE
412

→ USBPD SUPPORT IN POWER
SOURCE NO QC-PD
TRANSLATION IS REQUIRED
414

HARD RESET
MESSAGE

QC
SIGNALLING DETECTED ON D+/
D- LINES
416

YES → BOTH THE DEVICES SUPPORT
QC, NO QC-PD
TRANSLATION
418

No

PERFORM HVDCP
DETECTION IN POWER
SOURCE
420

HVDCP
DETECTED
422

YES → QC-PD TRANSLATION
424

No

NO QC SUPPORT AN
POWER SOURCES YES
QC-PD TRANSLATION
426

FIG. 4

SYSTEM AND METHOD FACILITATING TRANSLATION OF POWER DELIVERY AND QUICK CHARGE MESSAGE COMMUNICATION

CROSS REFERENCE TO RELATED APPLICATION(S)

This application claims the benefit of and priority to India Application Serial No. 202141057724, entitled "SYSTEM AND METHOD FACILITATING TRANSLATION OF POWER DELIVERY AND QUICK CHARGE MESSAGE COMMUNICATION" and filed on Dec. 11, 2021, which is expressly incorporated by reference herein in its entirety.

TECHNICAL FIELD

The present disclosure relates to a translation device for supporting quick charge (QC) and USB power delivery (USBPD) message translations, enabling power negotiations and faster charging of the USBPD device connected to a QC power source with no USBPD support.

BACKGROUND

Background description includes information that can be useful in understanding the present invention. It is not an admission that any of the information provided herein is prior art or relevant to the presently claimed invention, or that any publication specifically or implicitly referenced is prior art.

With USB power delivery (USBPD), a range of devices can share their power with one another and power each other without hassle even at higher wattages. USBPD is simply a much easier and a streamlined way to go about charging the USBC devices. As phones and devices continue to use up more and more power, USBPD is likely to become more and more common. Even power banks now have USBPD to charge or operate devices that demand a lot of power (think MacBooks, Switches, GoPros, drones and more) and certainly that power can be shared in the future. But, in existing power delivery systems, currently if a non-USBPD Power source is connected to a USBPD device such as mobile phone, there will not be any higher power negotiations between the two devices leading to default USBC charging rate. Also, when a QC power source that doesn't support USBPD is connected to a USBPD device and if no D+/D− signalling is possible between the devices, then there is no direct communication between the devices either over the CC lines or D+/D− lines, thus resulting in no power negotiations between QC power source and USBPD device leading to default USBC charging rate.

There is, therefore, a requirement in the art for a system and method that can overcome aforementioned problems and challenges in the art and enable communication mechanism and power negotiations through message translation between the QC power source and a USBPD device for faster charging of the USBPD device.

OBJECTS OF THE PRESENT DISCLOSURE

It is an object of the present disclosure to provide a system and method for facilitating communication between a QC power source with no USBPD support and a USBPD device.

It is an object of the present disclosure to provide a system and method for facilitating translation of quick charge signalling to power delivery messages and vice-versa.

It is an object of the present disclosure to provide a system and method for power delivery message handling in the translation device.

It is an object of the present disclosure to provide a system and method for establishing power negotiation between a QC power source and a USBPD device, thus enabling fast charging.

It is an object of the present disclosure to provide a system and method for handling power contract upgrades till the maximum power supported by the QC power source and the device.

It is an object of the present disclosure to provide a system and method that facilitates handling of quick charge power source VBUS collapse in the translation device.

SUMMARY

The present disclosure relates to systems and methods for supporting quick charge and power delivery message translations.

The present disclosure relates to a system facilitating communication and power negotiations between a Quick Charge (QC) power source and a USBPD device. The system primarily may include a translation device having at least two USBC ports configured to connect one USBC device per USBC port. The Quick Charge (QC) power source may be connected to a first USBC port of the translation device, and the USBPD device may be connected to a second USBC port of the translation device. The translation device may further include a detection module configured to detect one or more device connections and disconnections on the at least two USBC ports and further detect the power role of one or more connected devices in the at least two USBC ports, and USBPD and QC support in the one or more connected devices. The translation device may include a QC voltage discovery module configured to discover type, class and the supported voltage of a QC power source connected to the first USBC ports. The translation device may further include a control unit having one or more processors and a memory coupled with the one or more processors, the memory storing instructions executable by the one or more processors to: determine the one or more device connections, disconnections and power role of the one or more connected devices in the at least two USBC ports; monitor support of the USBPD and the QC in the one or more connected devices; facilitate a communication mechanism between the USBPD device and the QC power source by translation of any or a combination of USBPD messages on a CC line on the second port to QC signalling on one or more D+/D− lines of the first port and vice versa, if direct communication is not possible over either of the CC or the one or more D+/D− lines; and enable a power negotiation between the USBPD device and the QC power source.

In an embodiment, the predetermined translation device can be a charge-through VCONN Powered device (CTVPD), wherein the CTVPD is configured to: detect support of the QC and the USBPD in the USBC devices connected to the first and the second ports respectively and facilitate power negotiation between the QC power source and USBPD device by providing a communication mechanism between the QC power source connected to the first port and the USBPD device connected to the second port by handling the messages from the USBPD device either independently or by translating the USBPD messages to QC signalling and vice versa.

In an embodiment, the control unit together with the detection module may attempt to detect the support of the USBPD protocol in the power source connected to the first USBC port by monitoring the communication over the CC line. The control unit may identify the power source as non USBPD supported power source if a USBPD hard reset signalling is detected on the CC line before any other start of packet (SOP) message, else may identify the power source as a USBPD supported device if a start of packet (SOP) message is detected on the CC line.

In an embodiment, the control unit upon determining the non USBPD supported power source connected on one of its ports, further may configure the detection module to detect the support of high voltage dedicated charging ports (HVDCP) in the power source through the D+/D− signalling as per the HVDCP guidelines in the QC specification.

In an embodiment, the control unit upon the HVDCP detection, may further enable the QC voltage discovery module to discover the type, class and supported voltages of the QC power source through D+/D− signalling.

In an embodiment, the control unit upon the completion of QC voltage discovery may be configured to: enable the power negotiation between the QC power source and the USBPD device by translating the USBPD messages on the CC line on the second port to signalling on the D+/D− lines of the first port and vice versa; and handle a predefined set of messages from the USBPD device independently by generating a response with a set of predefined information.

In an embodiment, the translation device upon the completion of QC voltage discovery may be configured to: enable a power negotiation between the USBPD device and the QC power source. The power negotiation by the translation device may include: send source capabilities message on the CC line to the USBPD device to which the USBPD device responds with a request message by sending Request Data Object (RDO) on the CC line; decode the RDO and check if RDO is valid and then translate the valid RDO messages to the D+/D− signalling to inform the QC power source about the USBPD device power request; monitor the VBUS from the QC power source to reach a predefined requested voltage; and send a USBPD PS_RDY message to USBPD device on CC line to enable the USBPD device to draw the predefined power over the VBUS line once the VBUS has reached the predefined requested voltage, wherein the power negotiation comprises of a power nego- tiation Message Sequence on the CC line of the second port connected to USBPD device complying with the USBPD specification and the D+/D− signalling on the first port connected to QC power source complying with the QC specification.

In an embodiment, a power delivery power (PDP) to be advertised in the source capabilities message may be decided based on a class of the QC power source identified during the QC voltage discovery. The first power negotiation may be done with a first power threshold and further can be incremented to a second power threshold in a step wise fashion, wherein a second power threshold is a highest PDP that is advertised to the USBPD device based on the QC power source.

In an embodiment, one or more Power Data Objects (PDOs) in the source capabilities message may be populated based on the concluded PDP and the voltages supported by the QC power source discovered during the QC voltage discovery.

In an embodiment, the control unit may be configured to handle a capability mismatch requirement from the USBPD device by upgrading power based on a predefined set of instructions to the second power threshold in stepwise fashion. Upon receiving the capability mismatch require- ment from the sink and if negotiated power is less than second threshold power, a new power negotiation message sequence may be initiated by the translation device by incrementing the PDP by a minimum of the three predeter- mined amount, the three predetermined amounts pertain to a difference between the present PDP and the second power threshold, a difference between sink required power and the present PDP, and a predefined configurable wattage.

In an embodiment, the control unit may monitor the VBUS after each successful power negotiation to check for the VBUS collapse of the QC power source, wherein upon detection of the collapse, a hard reset signalling is sent to the USBPD device followed by a new power negotiation with a PDP equal to the first power threshold.

In an embodiment, the control unit upon detecting the VBUS collapse may be configured to: mask the capability mismatch requirements from the USBPD device; and avoid upgrading the PDP above the first power threshold until further disconnection-connection of the one or more con- nected devices connected to the first and the second ports.

In an embodiment, the control unit may be configured to handle one or more errors occurring during the USBPD communication as per the USBPD specification.

In an embodiment, the translation device disconnections may be handled as per the USBC specification, wherein information of the QC power source may be retained until the disconnection of the QC power source and may not be altered or modified due to the second port disconnection or connection.

In an embodiment, if the both the power source and a sink device are identified to support either USBPD or QC, then the HVDCP detection, the QC voltage discovery, power negotiation and message translation phases are not activated and the translation device may act as a bypass, wherein the communication between the one or more connected devices happens directly over either the CC line or D+/D− lines, thus enabling the power negotiations and fast charging of the USBPD sink device.

In an embodiment, if the power source is identified to not support any of the USBPD or QC, then the translation device may conclude on the legacy battery charging (BC1.2) dedi- cated charging port (DCP) as the power source in the discovery phase, and also a message translation phase is not activated.

In an embodiment, the translation device may be inte- grated in any of the one or more connected devices or the translation device is present external to the one or more connected devices or the translation device is powered either by any of the VCONN, the VBUS and a predefined supply or a combination thereof.

The present disclosure relates to a method facilitating communication and power negotiation between a Quick Charge (QC) power source and a USBPD device. The method may include the steps of determining, by a control unit embedded in a translation device, the one or more device connections, disconnections and power role of the one or more connected devices in the at least two USBC ports of the translation device. The Quick Charge (QC) power source may be connected to a first USBC port of the translation device, and, the USBPD device may be con- nected to a second USBC port of the translation device. The method may further include the step of monitoring, by the control unit, support of the USBPD and the QC in the one or more connected devices and the step of facilitating, by the control unit, a communication mechanism between the USBPD device and the QC power source by translation of any or a combination of USBPD messages on CC line on the second port to QC signalling on one or more D+/D− lines of the first port and vice versa, if direct communication is not possible over either of the CC or the one or more D+/D− lines. Furthermore, the method may include the step of enabling by the control unit, a power negotiation between the USBPD device and the QC power source.

Various objects, features, aspects and advantages of the inventive subject matter will become more apparent from the following detailed description of preferred embodiments, along with the accompanying drawing figures in which like numerals represent like components

BRIEF DESCRIPTION OF THE DRAWINGS

The diagrams are for illustration only, which thus is not a limitation of the present disclosure, and wherein:

FIG. 3 illustrates an exemplary method flow diagram in accordance with an embodiment of the present disclosure.

FIG. 4 illustrates an exemplary flow diagram representation of the proposed method in the translation device for monitoring the connected devices and enabling the message translations, in accordance with an embodiment of the present disclosure.

DETAILED DESCRIPTION

Figure 1:
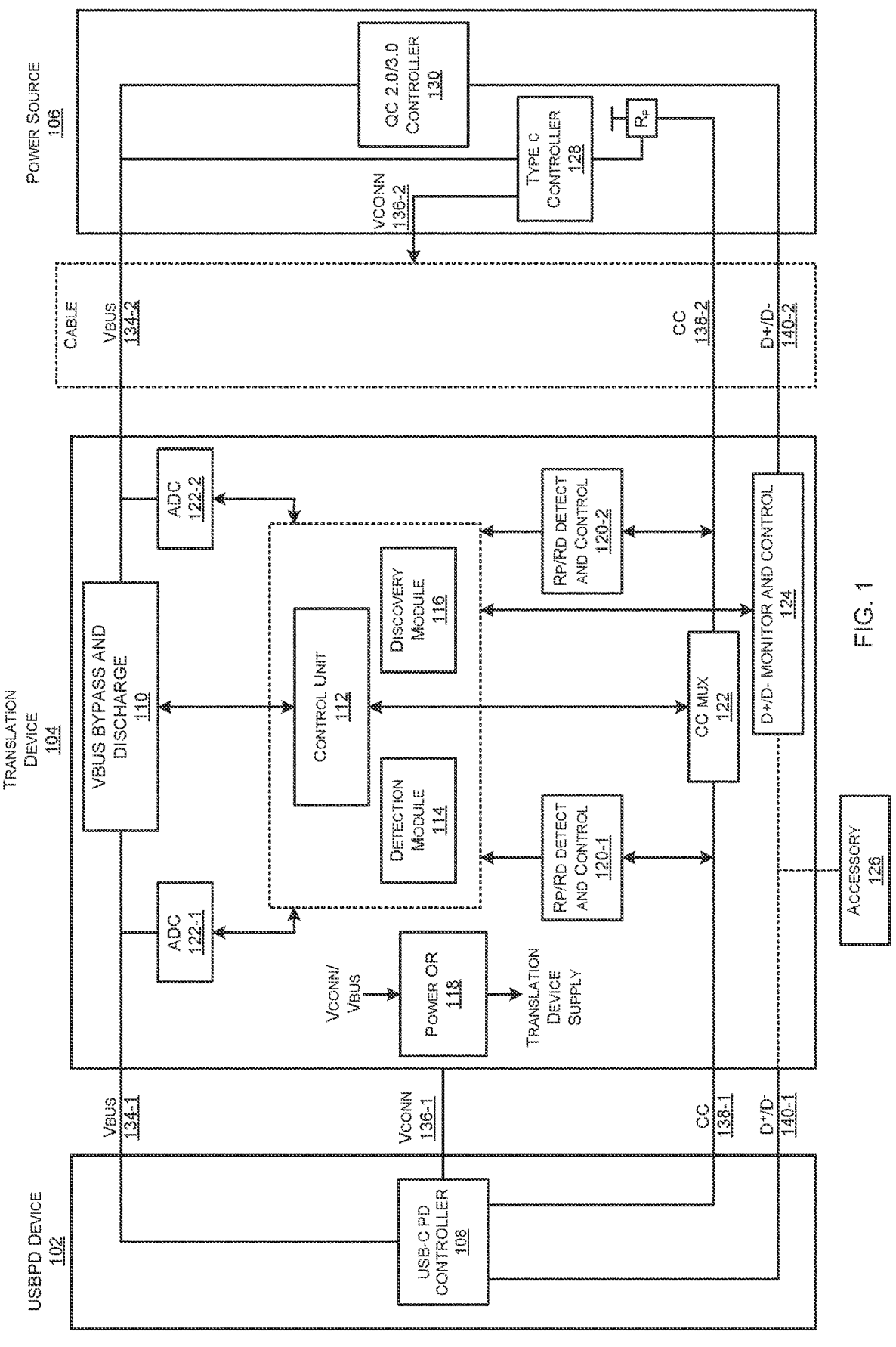
FIG. 1 illustrates an exemplary module diagram representation of the proposed system, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Embodiments of the present invention may be provided as a computer program product, which may include a machine-readable storage medium tangibly embodying thereon instructions, which may be used to program a computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), magneto-optical disks, semiconductor memories such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). A machine-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The present disclosure relates to a system and method to translate USBPD messages on CC line to QC signalling on D+/D− lines and vice versa and enable power negotiations between an USB Power delivery device and a quick charge (QC) supported power source that may be a non-USB power delivery (USBPD) device. The proposed method is implemented in the translation device having two USBC ports to which USBC devices can be connected. The proposed method establishes the power contract between a QC power source and USBPD device complying with the USBPD and QC specifications, by translating the USBPD message communication to QC communication and vice versa or handling the USBPD messages independently in translation device or combination of both, when a QC supported non-USBPD Type C Power Source is connected to a USBPD device via translation device.

FIG. 1 illustrates an exemplary system architecture of the proposed system, in accordance with an embodiment of the present disclosure. As illustrated, in an aspect, the system (100) may include a translation device comprising of two USBC port to which USBC devices can be connected. In an exemplary embodiment, the USBPD device (102) may be connected to the one of the Type C ports of the translation device (104) and the USBPD device (102) may include USB-C PD Controller (108) for controlling and monitoring a CC line (138-1), a VCONN (136-1) and a VBUS (134-1) and the like. A Type C power source may be connected to other Type C port of the translation device.

In an exemplary embodiment, a power source (106) coupled to the translation device (104) may include Type C Controller (128) on lines VBUS (134-2), CC (138-2), and VCONN (136-2) but not limited to the like. The power source may further include a QC controller (130) for controlling and monitoring the D+/D− lines (140-2) and the VBUS (134-2). Further, the power source may be a QC power source but not limited to the like.

In an exemplary embodiment, the power source (106) may include a QC support device with no USBPD support but not limited to the like.

In an exemplary embodiment, the translation device (104) may include a third port for routing the D+/D− lines (140-1) of USBPD device to an external accessory.

In an embodiment, the translation device (104) may include a detection module (114) to detect the connection or disconnection of the devices on both the Type-C ports, determine the power role of the connected devices and detect the support of USBPD and QC in the connected devices.

In an embodiment, the translation device (104) may include a voltage discovery module (116) (interchangeably referred to as the QC voltage discovery module (116)) to identify type, class, and supported voltage of the connected power source (106).

In an embodiment, the translation device (104) may include a control unit (112) comprising of processor executing set of instructions stored in one or more memories. The control unit (112) may cause the system to: identify the support of the USBPD in the connected devices by monitoring the message communications on one or more CC lines (138). For example, the one or more CC lines (138) can be either a first CC line (138-1) and a second CC line (138-2) and each individually may be referred to as the CC line (138) and collectively as the CC lines (138) hereinafter. The control unit (112) may further identify support of high voltage dedicated charging ports (HVDCP) in the connected devices through D+/D− signalling; identify type, class and supported voltages of the power source (106); initiate power negotiation with the USBPD device (102) by sending Source Capabilities messages on the CC line (138-1) to the USBPD device (102); translate any valid request from the USBPD device (102) to the power source (106) in form of the D+/D− (140-2) signalling, when the power source (106) happens to be a QC device with no USBPD support but not limited to it; monitor for VBUS (134-2) from the power source (106) through an ADC (122-2) for various purposes such as power source VBUS collapse monitoring. For example, the VBUS (134) can be either a first VBUS (134-1) and a second VBUS (134) and each individually may be referred to as the VBUS (134) and collectively as the VBUSs (134) hereinafter. The control unit (112) may further send a PS_RDY during power contracts and the like; control bypassing of the VBUS (134) from the power source (106) to USBPD device (102) as well as discharging the VBUS (134) lines on the respective ports; and control the CC line (138) muxing from the power source (106) to the USBPD device (102) by a CC MUX (122), controlling a pull up resistor (Rp) and a pulldown resistor (Rd) on the CC line (138).

In an embodiment, the control unit (112) together with the detection module (114) detect the support of the USBPD protocol in the power source (106) connected by monitoring the communication over the CC line (138). The control unit (112) may identify the power source (106) as non-USBPD supported power source if USBPD hard reset signalling is observed before any start of packet (SOP) messages on the CC lines. Else the control unit may identify the power source (106) as a USBPD supported device if Source Capabilities SOP message is first communicated over the CC lines before the Hard Reset Signalling is observed.

In an embodiment, the control unit (112) upon determining the non-USBPD supported power source (106) and no communication happening or possible over D+/D− lines (140) between the connected devices, further configures the detection module (114) to detect the support of high voltage dedicated charging ports (HVDCP) in the power source (106) through the D+/D− lines (140-2) as per the HVDCP guidelines.

In an embodiment, the control unit (112) upon the HVDCP detection, further enables the QC voltage discovery module (116) to discover the type, class, and supported voltages of the power source (106) through signalling on the D+/D− line (140-2).

In an embodiment, the control unit (112) upon the completion of QC voltage discovery may be configured to: enable the power negotiation between the power source (106) and the USBPD device (102) by translating the USBPD messages on the CC line (138-1) to QC signalling on the D+/D− lines (140-2) and vice versa; and handle a predefined set of messages from the USBPD device (102) either by translating to D+/D− line (140-1) signalling or by independently generating a response with a set of predefined information.

In an embodiment, the translation device (104) upon the completion of QC voltage discovery may be configured to: enable a higher power negotiation between the USBPD device (102) and the power source (106), wherein the higher power negotiation by the translation device comprises: sending source capabilities on the CC line to the USBPD device (102), and responding by the USBPD device (102) with a request message by sending Request Data Object (RDO) on the CC line (138-1); decode the RDO, send accept message to the USBPD device (102) for a valid RDO or send Reject message for an invalid RDO and translating the valid RDO messages to the signalling on D+/D− lines (140-2) to inform the power source (106) about the USBPD device (102) power request; monitor the VBUS (134-2) to reach a predefined voltage by ADC (122-2); send PS_RDY message to USBPD device (102) on CC line (138-1) to enable the USBPD device (102) to draw the predefined power over the VBUS line (134-1) once the VBUS(134) has reached the predefined voltage, wherein the higher power negotiation comprises of a USBPD power negotiation Message Sequence on the CC line (138-1) and the QC signalling on the D+/D− line (140-2).

In an embodiment, a power delivery power (PDP) to be advertised in the source capabilities message is decided based on a class of the power source (106) identified during the QC voltage discovery, wherein the first power negotiation is done with a first power threshold and further can be incremented to a second power threshold in a step wise fashion, wherein the second power threshold is the highest PDP that is supported by the given power source (106). In an exemplary embodiment, the first power threshold may be at least 18 W but not limited to it and the second power threshold may be 27 W but not limited to it.

In an embodiment, all of the power data objects (PDOs) in the source capabilities message are be populated based on the PDP and the voltages supported by the power source (106) discovered during the QC voltage discovery and a combination thereof.

In an embodiment, the control unit (112) may be configured to handle a capability mismatch requirement from the USBPD device (102) by upgrading power based on a predefined set of instructions to a second power threshold in stepwise fashion, wherein upon receiving the capability mismatch requirement from the USBPD device (102) and if negotiated power is less than second threshold power, a new power negotiation message sequence is initiated by the translation device (104) by incrementing the PDP by a predetermined amount, such that new PDP is less than or equal to the second power threshold or maximum PDP required by the USBPD device (102).

In an embodiment, the control unit (112) may monitor the VBUS (134-2) throughout the duration of valid power contract, to check for a VBUS collapse of the power source (106), wherein upon detection of the collapse, a hard reset signalling is sent to the USBPD device (102) followed by a new power negotiation with a PDP equal to the first power threshold.

In an embodiment, the control unit (112) may be configured to: mask the capability mismatch requirements from the USBPD device (102) upon detecting the VBUS collapse of power source (106); and avoid upgrading the PDP above the first power threshold until further disconnection-connection of the one or more devices connected to the translation device (104). In another embodiment, the control unit (112) may be configured to handle one or more errors occurring during the USBPD communication as per the USBPD specification.

In an embodiment, the device disconnection is handled as per the USBC and USBPD specifications, wherein information of the power source (106) is retained until the disconnection of the power source (106) and is not altered or modified due to power sinking device disconnection or connection. Alternatively, if the power source is identified to support the USBPD, then the HVDCP detection, the QC voltage discovery, higher power negotiation and message translation phases are not activated, wherein the communication between the USBPD power source and a USBPD sink device happens over the CC lines enabling higher power negotiations and fast charging of the UBSPD sink device as per the USBPD and USBC protocols. Alternatively, if both the devices are identified to support QC, then the HVDCP detection, Voltage discovery, power negotiation and message translation phases are not activated, where in communication between the devices happens over the D+/D− lines thus enabling the faster charging.

It will be clear to persons skilled in the art that the scope of the patent is pertaining to QC 2.0/QC 3.0 devices as the power source and the USBPD devices as power sink but not limited to the like.

Figure 2:
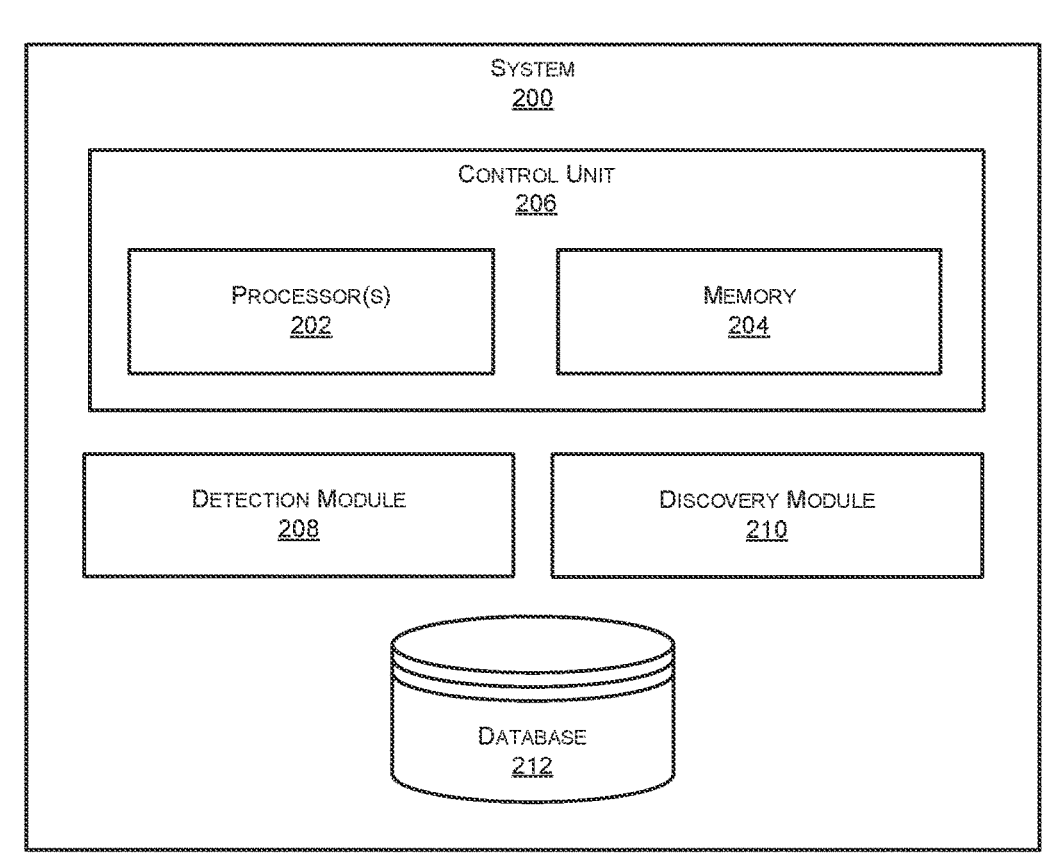
FIG. 2 illustrates an exemplary representation of a control unit of the proposed system in accordance with an embodiment of the present disclosure.

FIG. 2 illustrates an exemplary module diagram representation of the proposed translation device, in accordance with an embodiment of the present disclosure.

According to an embodiment, the translation device (200) can include one or more processor(s) (202). The one or more processor(s) (202) can be implemented as one or more microprocessors, microcomputers, microcontrollers, digital signal processors, central processing units, logic circuitries, and/or any devices that manipulate data based on operational instructions. Among other capabilities, the one or more processor(s) 202 are configured to fetch and execute computer-readable instructions stored in a memory (204) of the translation device (200). A person skilled in the art may understand that the translation device (200) can be another form of the translation device (104) having a similar set of functionalities and thus can be referred to as the translation device (200) or translation device (104) herein. The memory 204 can store one or more computer-readable instructions or routines, which can be fetched and executed to create or share the data units over a network service. The memory 204 can include any non-transitory storage device including, for example, volatile memory such as RAM, or non-volatile memory such as EPROM, flash memory, and the like.

Various components/units of the control unit (112) can be implemented as a combination of hardware and programming (for example, programmable instructions) to implement their one or more functionalities as elaborated further themselves or using processor(s) (202). In examples described herein, such combinations of hardware and programming can be implemented in several different ways. For example, the programming for the units can be processor executable instructions stored on a non-transitory machine-readable storage medium and the hardware for units can include a processing resource (for example, one or more processors), to execute such instructions. In the present examples, the machine-readable storage medium can store instructions that, when executed by the processing resource, implements the various units. In such examples, the translation device (200) can include the machine-readable storage medium storing the instructions and the processing resource to execute the instructions, or the machine-readable storage medium can be separate but accessible to the system (100) and the processing resource. In other examples, the units can be implemented by electronic circuitry. A database (212) can include data that is either stored or generated as a result of functionalities implemented by any of the other components/units of the proposed system (100). The system (100) may further include a translation device comprising of two USB Type-C ports to which USBC devices can be connected. The control unit (112) comprising the one or more processors (202) and the memory (204) coupled with the one or more processors (202), the memory storing instructions executable by the one or more processors to (202) to determine if USBC devices are connected to the Type-C ports of translation device and determine the power role of the connected devices, monitor, by a detection module (208), if the power source (106) is a QC supported non-USB power delivery (USBPD) power source and power sink is a USBPD device, the detection being performed based on a predefined set of USB charging protocol; and upon determining that the power source (106) with no USBPD support is connected to a USBPD device (102), facilitate a communication mechanism for translation of any or a combination of a quick charge (QC) signalling to USB power delivery communication and a USB power delivery (PD) communication to a QC signalling.

In an embodiment, the control unit (112) in the translation device (104) may be configured to translate USBPD message to QC signalling and QC signalling to USBPD messages when a non-USBPD and QC power source may be connected to a USBPD device (102) through the translation device (104).

In another embodiment, the system (100) further may include a voltage discovery module (210) (interchangeably referred to as the QC voltage discovery module or discovery module (116)) to find the type, class and supported voltages of the power source power source and may advertise the source capabilities accordingly.

In an embodiment, the system (100) may initiate the PD contract with a power data product (PDP) with a first threshold power that may be but not limited to an 18 W PDP where source Capabilities may be populated as per the maximum voltage identified during the voltage discovery and the determined PDP. The system may handle a capability mismatch requirement from the USBPD device, by upgrading the power in a conservative fashion by configurable wattage. For example, an x Watts may be upgraded to (x+y) Watts where 'x' is the present allocated power and 'y' is the minimum of the three of (i) a configurable amount of 2 Watts but not limited to it; (ii) second power threshold which can be 27 W; and (iii) maximum power required by the USBPD device (102). If power source VBUS collapse happens during power upgrade, PDP may fall back to 18 W and no further power upgrades are done.

In an embodiment, the system (100) may respond to a start of packet (SOP) message sent by the USBPD sink device only if QC to USBPD translation and vice versa is activated. The messages may be accordingly interpreted and translated to QC signalling. The system (100) may detect a power source VBUS collapse and may perform the USBPD hard reset mechanism followed by a downgraded power contract for example 18W but not limited to it.

In an embodiment, the system (100) may be designed to negotiate the power to a maximum capacity of the power source, thereby ensuring faster charging rate between the USBPD power sinking device and the power source (106).

In an embodiment, the system (100) can handle protocol errors occurring during the USBPD communication or in QC signalling and respond accordingly as per the respective specification guidelines.

In an embodiment, the system (100) may handle the power source devices disconnection as per USBPD and USBC guidelines. The system (100) may repeat voltage discovery only in case of the power source (106) disconnection and not in the case of USBPD device (102) disconnection or connection.

It would be appreciated that although the proposed system (100) has been elaborated as above to include all the main units, it is conceivable that actual implementations are well within the scope of the present disclosure, which can include without any limitation, only a part of the proposed units or a combination of those or a division of those into sub-units in various combinations across multiple devices that can be operatively coupled with each other, including in the cloud. Further, the units can be configured in any sequence to achieve objectives elaborated. Also, it can be appreciated that proposed system (100) can be configured in a computing device or across a plurality of computing devices operatively connected with each other, wherein the computing devices can be any of a computer, a laptop, a smart phone, an Internet enabled mobile device, and the like. Therefore, all possible modifications, implementations and embodiments of where and how the proposed system (100) is configured are well within the scope of the present invention.

FIG. 3 illustrates an exemplary flow diagram representation of the proposed method, in accordance with an embodiment of the present disclosure.

According to an embodiment, the method 300 can include at a step 302 of determining if the USBC devices are connected to the translation device and power role of the connected devices, and at a step 304 of monitoring, by a detection module, if the power source is a QC supported non-USBPD power source and if power sinking device supports USBPD. Upon determining that the power source is a QC supported non-USBPD power source the method may further include a step of 306, facilitating a communication mechanism for translation of any or a combination of a quick charge (QC) signalling to power delivery (USBPD) communication and a power delivery communication (USBPD) to a QC signalling.

FIG. 4 illustrates an exemplary flow diagram representation for a method of determining the QC and USBPD support in the connected devices and enabling of the QC-PD translation flow, in accordance with an embodiment of the present disclosure. As illustrated, the method, at 402, translation device waits for the connection of devices on both the USBC ports and after the connection detection it determines the power role of the connected devices to identify the power source and power sink at 404. After determining the power role of the devices, translation device further starts monitoring the CC and D+/D− lines at 406, during which if USBPD signalling are not detected on the CC line at 408, no QC-PD translation is enabled at 410 as both of the devices don't support USBPD. At 408, if USBPD signalling is detected on the CC line and if first USBPD signalling on CC line is start of packet (SOP) source capabilities message at 412, then translation device determines that USBPD is supported in the QC power source and QC-PD translation phase is not enabled at 414, else if first signalling at 412 is USBPD hard reset signalling, then translation device determines that USBPD is not supported in the power source and if further QC signalling is detected on D+/D− lines at 416, then translation device determines that QC is supported in the both the power source and the USBPD device and direct communication is possible over D+/D− lines and QC-PD translation mechanism is not enabled at 418. If QC signalling is not detected on D+/D− lines at 416, then translation device determines that there is no direct communication happening between the devices on either on CC line or D+/D− lines and further performs High Voltage Dedicated Charging Port (HVDCP) detection in the power source at 420. If HVDCP is detected in the power source at 422, translation device determines that QC is supported in the connected power source and proceeds with QC-PD translation flow at 424. Else if HVDCP is not detected at 422, translation device determines QC is not supported in the Power source and QC-PD translation flow is not enabled and charging happens at default USBC charging rate at 426.

Figure 5:
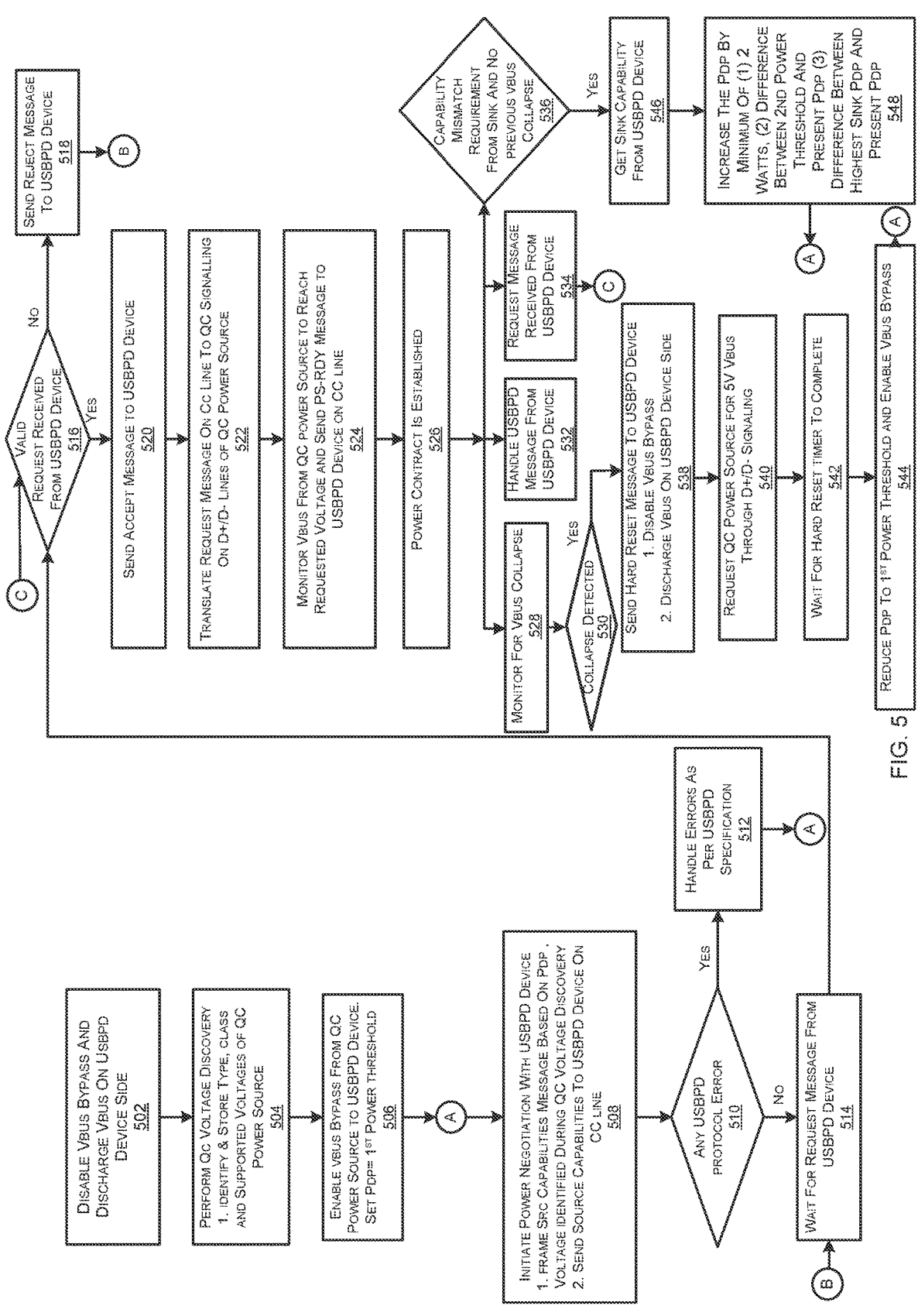
FIG. 5 illustrates an exemplary flow diagram representation for a method of QC and USBPD translations, and power negotiations, in accordance with an embodiment of the present disclosure.

FIG. 5 illustrates an exemplary flow diagram representation of a method QC-PD translation flow chart in the control unit, in accordance with an embodiment of the present disclosure. As illustrated, the method (500), at block 502, the first step in QC-PD translation is to disable VBUS bypass from the QC power source to the USBPD device and discharge VBUS (134-1) on the USBPD device side. Further at block 504, the QC voltage discovery may be performed to identify type, class and supported voltages of QC power source. At block 506, the control unit enables back VBUS bypass from QC power source to USBPD device and sets PDP to first power threshold i.e., 18 W and then at block 508, the control unit initiates power negotiation by sending source capabilities to the USBPD device. Source capabilities message is framed as per the voltages supported in QC power source that are identified during QC voltage discovery and as per the PDP value.

In an exemplary embodiment, at block 510, the control unit monitors for errors and further handles any errors during the USBPD message communication as per the USBPD specification at block 512. Further, control unit waits for receiving the request message from the USBPD device at block 514, the control unit at block 516 evaluates whether the received request message is valid or invalid as per the USBPD specification and sends accept message to USBPD device if request is valid at block 520 and sends reject message if request is invalid at block 518. If request is invalid, it further waits for receiving the valid request from USBPD device at block 514. On receiving a valid request, the control unit translates the request message from USBPD device to QC power source in form of D+/D− signalling at block 522.

At block 524, the control unit further monitors for the VBUS from the QC power source to reach desired voltage as requested in the Request Data Object (RDO) sent by USBPD device and upon reaching the requested voltage, the control unit sends PS_RDY message to USBPD device resulting in power contract to be established as per the request message. At block 526, the VBUS remains bypassed from QC power source to the USBPD device. At 532, The control unit further handles the messages from USBPD device as per the USBPD specification and the extent of features that are selected to be supported in the translation device.

At block 528, the control unit monitors for the VBUS collapse behaviour and upon identifying VBUS collapse at block 530, sends hard reset signalling on CC line to USBPD device, disables VBUS bypass and discharges the VBUS line on USBPD device side at block 538. At block 540, the control unit further sends D+/D− signalling to request the QC power source for 5V VBUS and upon completion of hard reset window at block 542, enables VBUS bypass from QC power source to USBPD device followed by reducing the PDP to 18 W at block 544 and initiates power negotiation again with the new PDP i.e., goes back to block 512.

At block 532, the control unit further handles message from the USBPD device as per the USBPD specification and the extent of features that are selected to be supported in the translation device and at block 534, the control unit receives request message form the USBPD device and then goes back to block 516.

At block 536, the control unit also handles capability mismatch requirement from USBPD device if previously no VBUS collapse is detected for given USBPD device and QC power source connection. It handles capability mismatch by getting the sink capabilities from USBPD device as per USBPD specification at block 546 and by increasing the PDP by minimum of the three of (i) 2 Watts; (ii) 2nd power threshold-present PDP; and (iii) highest sink capability PDP—present PDP at block 548 and reinitiating the contract with new PDP i.e., going to block 512.

Figure 6:
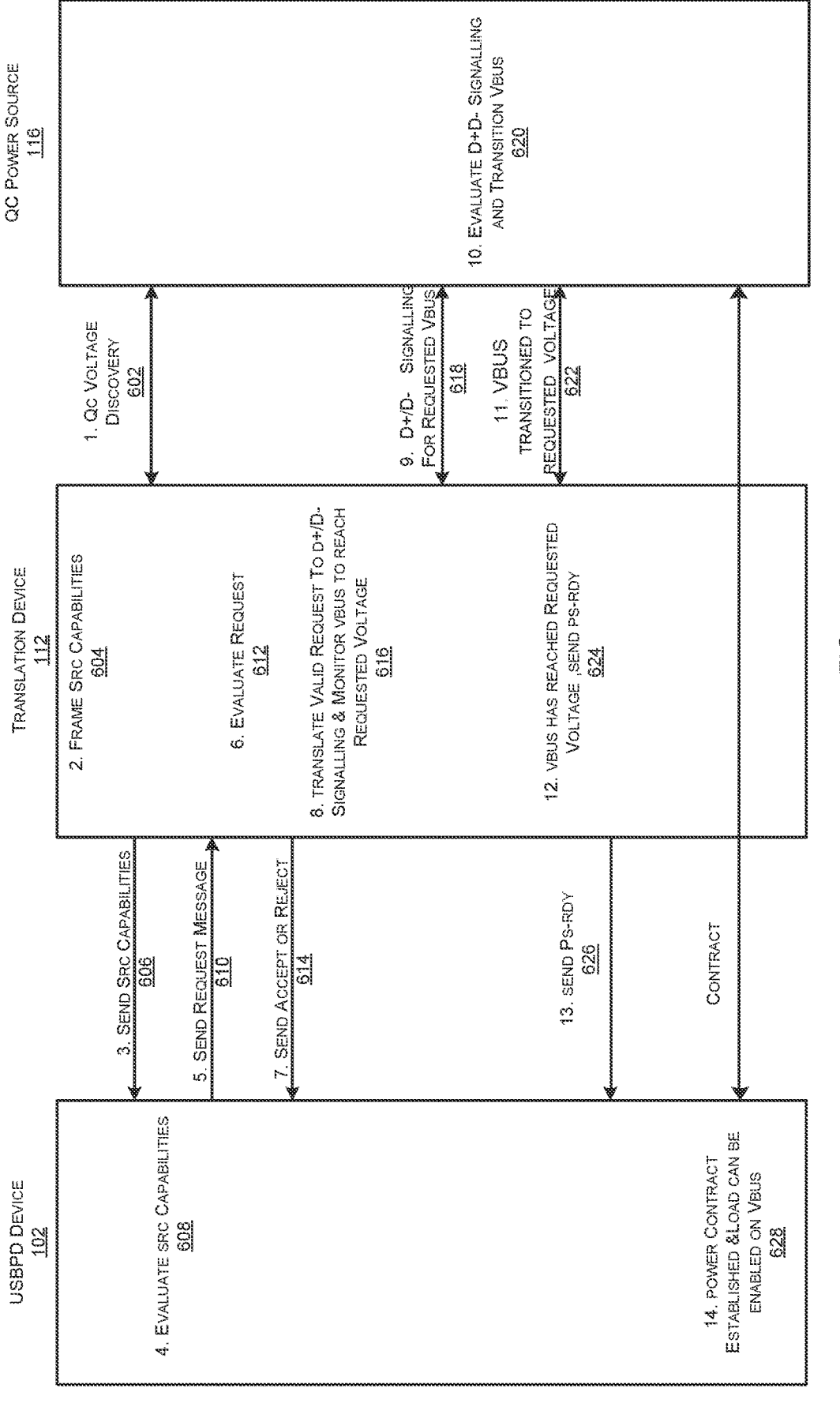
FIG. 6 illustrates an exemplary flow diagram representation of a power negotiation between a QC power source with no USBPD support and a USBPD device, in accordance with an embodiment of the present disclosure.

FIG. 6 illustrates an exemplary flow diagram representation of a method of power negotiation between the QC power source (630) and USBPD device (102) through message translations, in accordance with an embodiment of the present disclosure. The flow depicts abstract level communication happening between the USBPD device (102), the translation device (104) and the QC power source (630). Detailed USBPD message handshake is not shown in the FIG. 6. Initially, at step 602, a QC voltage discovery is performed upon detecting HVDCP support in QC power source (630). At step 604, the control unit in translation device (104) then frames source capabilities message based on the PDP and voltages identified during QC voltage discovery. At step 606, the control unit then initiates power negotiation by sending source capabilities message on the CC line to USBPD device (102). The USBPD device (102) at step 608, then evaluates the source capabilities message received on the CC line. At step 610, the USBPD device (102) further sends request message on the CC line based on the received source capabilities and at step 612, the control unit in the translation device (104) evaluates the request message received on CC line. At step 614, the control unit further sends accept for a valid request received and reject for the invalid request received and at step 616, translates the valid request sent by the USBPD device (102) on the CC line to D+/D− signalling to the QC power source (630) and monitors the VBUS from the QC power source (630) to reach requested voltage and at step 618, the D+/D− lines on QC side are toggled in accordance with step 616. At step 620, the QC power source (630) further evaluates D+/D− signalling and transitions the VBUS to requested voltage level and at 622, the VBUS reaches the requested voltage as supplied by the QC power source (630). The control unit further on identifying that the VBUS reached the requested voltage, forms PS_RDY message to send to the USBPD device at step 624 and at step 626, PS_RDY message is sent to the USBPD device (102) to indicate VBUS is stable. At step 628, power contract is now established and the USBPD device (102) can enable the load on VBUS.

In an exemplary embodiment, the voltage discovery may be done only once for the given QC power source connection and steps 604-628 may be repeated for any further new power contracts for the given connection.

Thus, it will be appreciated by those of ordinary skill in the art that the diagrams, schematics, illustrations, and the like represent conceptual views or processes illustrating systems and methods embodying this invention. The functions of the various elements shown in the figures can be provided through the use of dedicated hardware as well as hardware capable of executing associated software. Similarly, any switches shown in the figures are conceptual only. Their function can be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention can be practiced without these specific details. In some instances, well-known structures and devices are shown in block diagram form, rather than in detail, to avoid obscuring the present invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention can be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

The present disclosure provides a system and method for facilitating communication between a QC power source and a USBPD device.

The present disclosure provides a system and method for facilitating quick charge to power delivery message translation and vice-versa.

The present disclosure provides a system and method for establishing power negotiation between a QC power source and a USBPD device, thus enabling fast charging.

The present disclosure provides a system and method for handling power contract upgrades till the maximum power supported by the QC power source and the device.

The present disclosure provides for a system and method for power delivery message handling in the translation device.

The present disclosure provides for a system and method that facilitates handling of quick charge power source collapse in the translation device.

We claim:

1. A system facilitating communication and power negotiations between a Quick Charge (QC) power source and a USB power delivery (USBPD) device, said system comprising:

a translation device having at least two USBC ports, said at least two USBC ports are configured to connect one USBC device per USBC port, wherein:

the QC power source is connected to a first USBC port of the translation device, and the USBPD device is connected to a second USBC port of the translation device, wherein the translation device further comprises:

a control unit, said control unit comprising one or more processors and a non-transitory memory coupled with the one or more processors, the memory storing instructions executable by the one or more processors to:

detect one or more device connections and disconnections on the at least two USBC ports, detect a power role of one or more connected devices in the at least two USBC ports, and detect a USBPD and a QC support in the one or more connected devices;

discover type, class, and supported voltage of the QC power source connected to the first USBC port;

determine the one or more device connections, disconnections, and the power role of the one or more connected devices in the at least two USBC ports;

monitor support of USBPD protocol and the QC protocol by the one or more connected devices;

attempt to detect support of a USBPD protocol in the QC power source connected to the first USBC port by monitoring the communication over the CC line, wherein the control unit identifies the QC power source as a non-USBPD supported power source if a USBPD hard reset is detected on the CC line before any other start of packet (SOP) message, else identifies the QC power source as a USBPD supported device if a SOP message is detected on the CC line;

facilitate a communication mechanism between the USBPD device and the QC power source by translation of any or a combination of USBPD messages on a CC line on the second USBC port to QC on one or more D+/D− lines of the first USBC port and vice versa, if direct communication is not possible over either of the CC line or the one or more D+/D− lines; and enable a power negotiation between the USBPD device and the QC power source.

2. The system as claimed in claim 1, wherein the translation device is a charge-through VCONN Powered device (CTVPD), wherein the CTVPD is configured to:

detect support of the QC and the USBPD in the QC power source and the USBPD device connected to the first and the second USBC ports respectively;

facilitate the power negotiation between the QC power source and the USBPD device by providing a communication mechanism between the QC power source connected to the first USBC port and the USBPD device connected to the second USBC port by handling the messages from the USBPD device either independently or by translating the USBPD messages to the QC and vice versa.

3. The system as claimed in claim 1, wherein the control unit upon determining the non-USBPD supported power source being connected on one of the at least two USBC ports, further detects support of high voltage dedicated charging ports (HVDCP) in the non-USBPD supported power source through a D+/D− signaling as per HVDCP guidelines in a QC specification.

4. The system as claimed in claim 3, wherein the control unit upon high voltage dedicated charging ports (HVDCP) detection, further discovers the type, class, and supported voltages of the QC power source through D+/D− signaling.

5. The system as claimed in claim 4, wherein the control unit upon a completion of QC voltage discovery is configured to:

enable the power negotiation between the QC power source and the USBPD device by translating the USBPD messages on the CC line on the second USBC port to QC on the D+/D− lines of the first USBC port and vice versa; and handle a predefined set of messages from the USBPD device independently by generating a response with a set of predefined information.

6. The system as claimed in claim 5, wherein the translation device upon the completion of QC voltage discovery is configured to:

enable the power negotiation between the USBPD device and the QC power source, wherein the power negotiation by the translation device comprises:

send a source capabilities message on the CC line to the USBPD device to which the USBPD device responds with a request message by sending a request data object (RDO) on the CC line;

decode the RDO, check if the RDO is valid and translate the valid RDO messages to the D+/D− to inform the QC power source about the USBPD device power request;

monitor a VBUS from the QC power source to reach a predefined requested voltage; and send a USBPD PS_RDY message to the USBPD device on the CC line to enable the USBPD device to draw a predefined power over the VBUS line once the VBUS has reached the predefined requested voltage, wherein the power negotiation comprises of a power negotiation message sequence on the CC line of the second USBC port connected to the USBPD device complying with a USBPD specification and the D+/D− on the first USBC port connected to the QC power source complying with a QC specification.

7. The system as claimed in claim 6, wherein a power delivery power (PDP) to be advertised in the source capabilities message is decided based on a class of the QC power source identified during the QC voltage discovery, wherein a first power negotiation is done with a first power threshold and is incremented to a second power threshold in a step wise fashion, and the second power threshold is a highest PDP that is advertised to the USBPD device based on the QC power source.

8. The system as claimed in claim 6, wherein one or more power data objects (PDOs) in the source capabilities message are populated based on a concluded PDP and the voltages supported by the QC power source discovered during the QC voltage discovery.

9. The system claimed in claim 5, wherein if both the QC power source and the USBPD device as a sink device are identified to support either USBPD or QC, then high voltage dedicated charging ports (HVDCP) detection, the QC voltage discovery, the power negotiation, and a message translation phase are not activated and the translation device acts as a bypass, wherein the communication between the one or more connected devices happens directly over either the CC line or the one or more D+/D− lines, enabling the power negotiations and fast charging of the sink device.

10. The system as claimed in claim 9, wherein if a power source is identified to not support any of the USBPD or QC protocols, then the translation device concludes on legacy battery charging dedicated charging port (DCP) as the power source in a discovery phase, and the message translation phase is not activated.

11. The system as claimed in claim 1, wherein the control unit is configured to handle a capability mismatch requirement from the USBPD device by upgrading power based on a predefined set of instructions to a second power threshold in stepwise fashion, wherein upon receiving the capability mismatch requirement from the USBPD device and if negotiated power is less than the second threshold power, a new power negotiation message sequence is initiated by the translation device by incrementing a power delivery power (PDP) by a minimum of three predetermined amounts, the three predetermined amounts pertain to a difference between a present PDP and the second power threshold, a difference between sink required power and the present PDP and a predefined configurable wattage.

12. The system as claimed in claim 11, wherein the control unit monitors VBUS after each successful power negotiation to check for VBUS collapse of the QC power source, wherein upon detection of the VBUS collapse, a hard reset is sent to the USBPD device followed by a new power negotiation with a power delivery power (PDP) equal to a first power threshold.

13. The system as claimed in claim 12, wherein the control unit upon detecting the VBUS collapse is configured to:
  mask the capability mismatch requirements from the USBPD device; and
  avoid upgrading the PDP above the first power threshold until further disconnection-connection of the one or more connected devices connected to the first and the second USBC ports.

14. The system as claimed in claim 1, wherein the control unit is configured to handle one or more errors occurring during USBPD communication as per a USBPD specification.

15. The system as claimed in claim 1, wherein the translation device disconnections are handled as per USBC specification, wherein information of the QC power source is retained until the disconnection of the QC power source and is not altered or modified due to the second USBC port disconnection or connection.

16. The system as claimed in claim 1, wherein the translation device is integrated in any of the one or more connected devices, or the translation device is present external to the one or more connected devices, or the translation device is powered either by any of a VCONN, a VBUS, a predefined supply, or any combination thereof.

17. A method facilitating communication and power negotiation between a Quick Charge (QC) power source and a USB power delivery (USBPD) device, said method comprising:
  executing, by one or more processors of a translation device, instructions stored in a non-transitory memory coupled with the one or more processors to determine one or more device connections, disconnections and a power role of one or more connected devices in at least two USBC ports of the translation device, wherein:
  the QC power source is connected to a first USBC port of the translation device, and
  the USBPD device is connected to a second USBC port of the translation device;
  executing, by the one or more processors, instructions stored in the non-transitory memory to monitor support of USBPD protocol and the QC protocol by the one or more connected devices;
  executing, by the one or more processors, instructions stored in the non-transitory memory to determine whether the QC power source connected to the first USBC port supports a USBPD protocol by monitoring the communication over the CC line, wherein determining comprises identifying the QC power source as a non-USBPD supported power source in response to detecting a USBPD hard reset on the CC line before any other start of packet (SOP) message, and identifying the QC power source as a USBPD supported device in response to detecting a SOP message on the CC line;
  executing, by the one or more processors, instructions stored in the non-transitory memory to facilitate a communication mechanism between the USBPD device and the QC power source by translation of any or a combination of USBPD messages on one or more CC lines on the second USBC port to QC on one or more D+/D− lines of the first USBC port and vice versa, if direct communication is not possible over either of the one or more CC lines or the one or more D+/D− lines; and
  executing, by the one or more processors, instructions stored in the non-transitory memory to enable the power negotiation between the USBPD device and the QC power source.

* * * * *